(12) United States Patent
Ayyildiz

(10) Patent No.: US 9,199,416 B2
(45) Date of Patent: Dec. 1, 2015

(54) PRODUCTION METHOD OF TIRE CAP PLY STRIP

(76) Inventor: Yucel Ayyildiz, Kocaeli (TR)

( * ) Notice: Subject to any disclaimer, the term of this patent is extended or adjusted under 35 U.S.C. 154(b) by 169 days.

(21) Appl. No.: 13/824,690

(22) PCT Filed: Mar. 30, 2012

(86) PCT No.: PCT/IB2012/051537
§ 371 (c)(1),
(2), (4) Date: Mar. 18, 2013

(87) PCT Pub. No.: WO2012/146990
PCT Pub. Date: Nov. 1, 2012

(65) Prior Publication Data
US 2014/0151921 A1 Jun. 5, 2014

(30) Foreign Application Priority Data
Apr. 26, 2011 (TR) ................. a 2011 04076

(51) Int. Cl.
| | |
|---|---|
| B29D 30/38 | (2006.01) |
| B29D 30/40 | (2006.01) |
| B29C 70/50 | (2006.01) |
| B29C 70/06 | (2006.01) |
| B29B 15/14 | (2006.01) |
| B29B 15/12 | (2006.01) |
| D06M 23/00 | (2006.01) |
| B29C 70/52 | (2006.01) |
| B32B 5/02 | (2006.01) |
| B32B 5/12 | (2006.01) |
| B32B 5/26 | (2006.01) |

(52) U.S. Cl.
CPC ............. *B29C 70/06* (2013.01); *B29B 15/122* (2013.01); *B29B 15/125* (2013.01); *B29B 15/14* (2013.01); *B29D 30/38* (2013.01); *B29D 30/40* (2013.01); *D06M 23/00* (2013.01); *B29C 70/50* (2013.01); *B29C 70/52* (2013.01); *B29C 70/521* (2013.01); *B29D 2030/381* (2013.01); *B29D 2030/383* (2013.01); *B32B 5/02* (2013.01); *B32B 5/12* (2013.01); *B32B 5/26* (2013.01)

(58) Field of Classification Search
None
See application file for complete search history.

(56) References Cited

U.S. PATENT DOCUMENTS

| | | | |
|---|---|---|---|
| 2,738,298 A | | 3/1956 | David |
| 3,282,724 A | * | 11/1966 | Atwell ............................. 442/63 |
| 3,301,932 A | * | 1/1967 | Chisholm ................. 264/171.21 |
| 3,726,753 A | * | 4/1973 | Marzocchi et al. ......... 428/296.1 |
| 3,878,813 A | * | 4/1975 | Roberson et al. ............. 118/104 |
| 4,062,989 A | | 12/1977 | Long |
| 4,274,821 A | * | 6/1981 | Kiemer .......................... 425/114 |
| 4,501,771 A | | 2/1985 | Long |
| 7,252,129 B2 | * | 8/2007 | Michiels et al. ............... 152/531 |
| 7,851,015 B2 | * | 12/2010 | Terschueren ............... 427/207.1 |

(Continued)

FOREIGN PATENT DOCUMENTS

| | | |
|---|---|---|
| DE | 102006014142 A1 | 10/2007 |
| EP | 1577121 A2 | 9/2005 |

(Continued)

*Primary Examiner* — Jeffrey Wollschlager
(74) *Attorney, Agent, or Firm* — Gokalp Bayramoglu

(57) ABSTRACT

The present invention relates to a production method of tire cap ply strip (100) by using micro spinning method. The objective of the invention is to provide a production method of tire cap ply strip which is obtained in non-woven state and by the method of micro spinning in order to eliminate the additional processes such as calendaring, coating by extrusion.

7 Claims, 2 Drawing Sheets

(56) References Cited

U.S. PATENT DOCUMENTS

Figure 1:
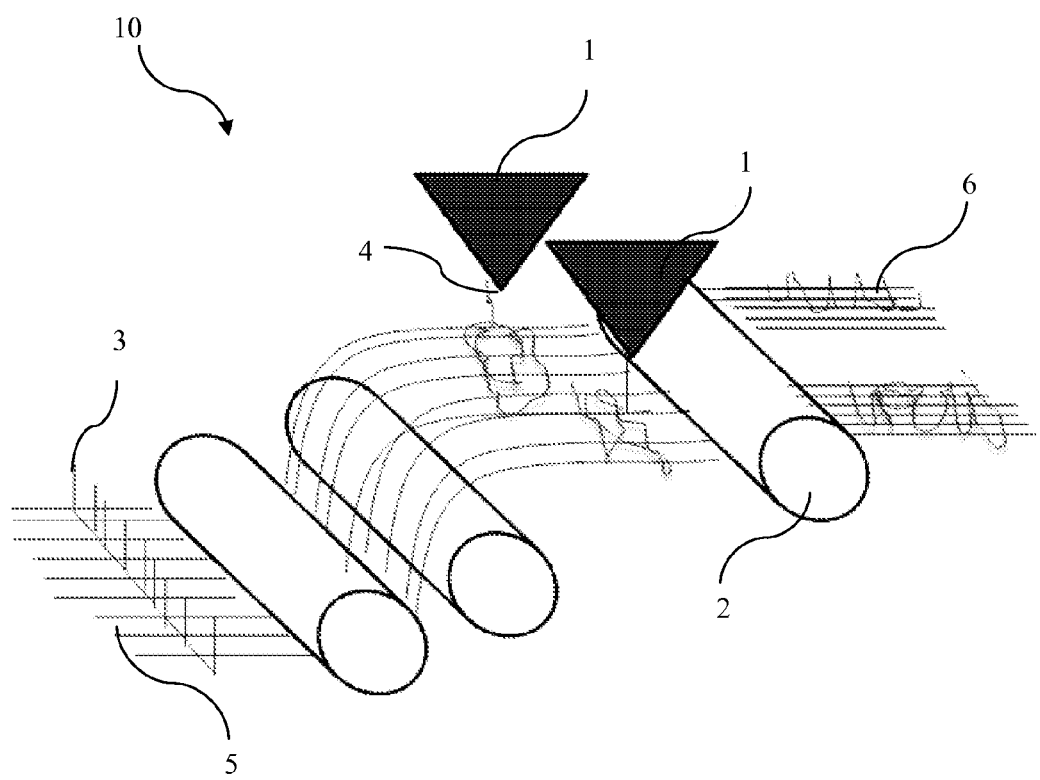

| | | | |
|---|---|---|---|
| 7,879,391 B2* | 2/2011 | Stamper et al. | 427/177 |
| 2002/0074068 A1* | 6/2002 | Howland et al. | 152/310 |
| 2005/0087900 A1 | 4/2005 | Allen et al. | |
| 2006/0006585 A1* | 1/2006 | Suzuki | 264/479 |
| 2006/0208391 A1* | 9/2006 | Abdallah | 264/171.15 |
| 2007/0122605 A1* | 5/2007 | Downing | 428/295.1 |
| 2009/0229760 A1 | 9/2009 | Hamlyn | |
| 2011/0220263 A1* | 9/2011 | Michiels | 152/526 |

FOREIGN PATENT DOCUMENTS

| | | |
|---|---|---|
| GB | 868954 A | 5/1961 |
| GB | 1150715 A | 4/1969 |

\* cited by examiner

PRODUCTION METHOD OF TIRE CAP PLY STRIP

FIELD OF THE INVENTION

The present invention relates to a production method of a tire cap ply strip by using micro spinning method.

BACKGROUND OF THE INVENTION

Seamless nylon cords are used in tires as shock absorbing elements. The said cords are coated with rubber and after coating they are made into strips and used for production of tires.

There are two applications known in the art for production of cord fabric used as reinforcing strip in tires. One of these applications is the cord fabric, after being woven, being coated with rubber and cut into strips. Another application is the steelastic method wherein cords are coated by using extrusion process. In this method, cords which are single cords are coated with rubber by applying extrusion process. Afterwards, the cords are separated and cut into strips. However in these applications, weaving the cords and coating them with rubber when making them into strips cause loss of time and expenditure. Furthermore, ensuring that the cords do not fall apart after cutting requires an additional process.

Micro spinning (melting the polymer at a certain temperature and making it into filament by means of extruder) method is a method known as non-woven coating that is used in recent years in coating industry. This method is carried out in two different ways, namely melt spinning and electro spinning. Melt spinning method is based on discharging molten polymers on a moving conveyor by means of feeding elements called spinnerets, in a spinning manner. Micro filaments obtained by means of spinnerets are ensured to bond upon being mixed on the surface intended to be coated via the oscillation provided by the spinnerets. In the electro spinning method, polymers are applied at room temperature without being molten.

The U.S. Pat. No. 7,252,129, one of the applications known in the art, discloses cutting a completely leno woven cord fabric into strips and using these fabrics in the application of cap ply.

The Great Britain patent document no. UK868954, one of the applications known in the art, discloses obtaining cord fabric by passing dipped (coated with chemical solution and cured) single cords through a reed.

The Great Britain patent document no. GB1150715, one of the applications known in the art, discloses a coating material produced by means of melt spinning method for use in tires. Generally terephthalate is selected to be used as polyester in these tire cords.

The United States patent document no. US2006006585, one of the applications known in the art, discloses an apparatus and method used for production of micro filaments. The micro filaments produced here can be used in production of non-woven fabric.

SUMMARY OF THE INVENTION

The objective of the present invention is to provide a tire cap ply strip obtained in non-woven state and production method thereof.

Another objective of the invention is to provide a tire cap ply strip obtained by the method of micro spinning in order to eliminate the additional processes such as calendaring, coating by extrusion; and production method thereof.

DETAILED DESCRIPTION OF THE INVENTION

"A tire cap ply strip and production method thereof" developed to fulfill the objective of the present invention is illustrated in the accompanying figures wherein, FIG. 1 is the schematic view of the production system of the tire cap ply strip.

Figure 2:
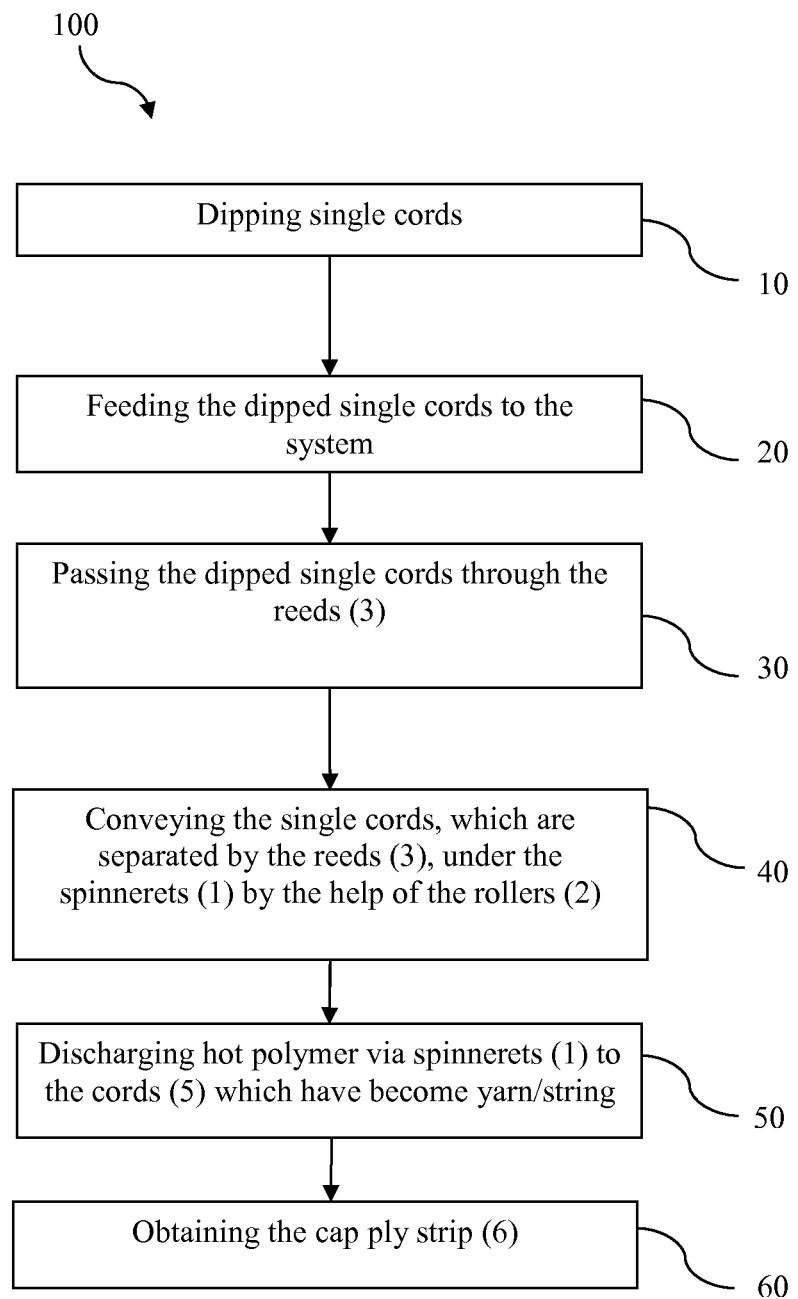

FIG. 2 is the view of the flowchart of the production method of the tire cap ply strip.

The components in the figures are assigned numerals as follows:

10. Micro spinning system
1. Spinneret
2. Cord carrier roller
3. Reed
4. Micro filament
5. Dipped single cords
6. Cap ply strip The production method of the tire cap ply strip developed to fulfill the objective of the present invention is comprised of the following steps:

dipping single cords (10),
feeding the dipped single cords (5) to the system (20),
passing the dipped single cords (5) through the reeds (3) (30),
conveying the single cords, which are separated by the reeds (3), under the spinnerets (1) by the help of the rollers (2) (40),
discharging hot polymer via spinnerets (1) to the cords (5) which have become yarn/string (50),
obtaining the cap ply strip (6) (60).

In the preferred embodiment of the invention, in the step of dipping single cords (10); a polymer selected from a group comprising polyamide (nylon), polyesters, acrylic materials, soluble styrene butadiene polymers or a mixture of these is used as filament (4).

In the preferred embodiment of the invention, in the step of dipping single cords (10), melt spinning method is performed wherein polymers are molten at a temperature range of 50-300° C.

In another embodiment of the invention, in the step of dipping single cords (10), an adhesive material is used as the filament (4).

The inventive production method of tire cap ply strip (100) is performed by micro spinning process. This method (100) begins with the process of dipping single cords (10). Green tack adhesion test is applied to the molten polymers or adhesives. Green tack can be described as self adhesion property of the cord when it overlaps or the force that must be exerted to separate the cord from the rubber plate when it is wrapped with rubber plate. As green tack can be provided in normal wrapping conditions, it can also be provided by heat treatment or by applying high tension and pressure. The polymer used here must prevent dislocation of the cords after it adheres on the cords and chills. Furthermore, the polymer used should be compatible with the rubber mixture that is used later in tire production and should be able to form a chemical bond with the tire rubber mixture during tire curing process.

Dipped (treated with chemical solution and cured) (10) single cords (5) are fed into the micro spinning system via a creel system (20). This way the cords are brought next to each other in order to obtain strips. Then the cords (5) are passed through the reeds (3) and a smooth structure is obtained (30).

The number of cords in the strip and the desired properties regarding strip width are provided by using different reed numbers. The single cords (5) which are separated by the reed (3) are conveyed to the spinnerets (1) by the rollers (2) (40). Oscillated micro filaments are discharged onto the cords (5) from the spinnerets (1) which are oscillatory discharging elements (50). Cap ply strips (6) are obtained (60) without any deformation of the structural properties of the cords (5) that are obtained following the said process.

In the inventive tire cap ply strip and production method thereof, additional processes such as calendaring, coating by extrusion are eliminated thanks to micro spinning method (10). Thus, loss of time and expenses are eliminated.

Within the framework of these basic concepts, it is possible to develop a wide variety of embodiments of the inventive tire cap ply strip and a production method thereof (100). The invention cannot be limited to the examples described herein; it is essentially as defined in the claims.

The invention claimed is:

1. A method of producing of a tire cap ply strip the method comprising:
   dipping a plurality of single cords therefore creating a plurality of dipped single cords;
   feeding the plurality of dipped single cords to a system;
   passing the plurality of dipped single cords through a reed;
   conveying the plurality of dipped single cords which are separated by the reed under a plurality of spinnerets by the help of a plurality of rollers;
   discharging molten polymer which has become yarn/string via the plurality of spinnerets onto the cords; and
   obtaining the tire cap ply strip.

2. The method of claim 1 wherein the polymer is selected from the group consisting of polyamides, polyesters, acrylic materials and meltable styrene butadiene polymers or a mixture of these.

3. The method of claim 1 wherein the polymer discharged on the plurality of single cords are molten at a temperature range of 50-300° C. after dipping of the plurality of single cords.

4. The method of claim 2 wherein the polymer discharged on the plurality of single cords are molten at a temperature range of 50-300° C. after dipping of the plurality of single cords.

5. The method of claim 2 wherein the polymer discharged on the plurality of single cords being an adhesive material in order to keep the single cords together after dipping the plurality of single cords.

6. The method of claim 3 wherein the polymer discharged on the plurality of single cords being an adhesive material in order to keep the single cords together after dipping the plurality of single cords.

7. The method of claim 4 wherein the polymer discharged on the plurality of single cords being an adhesive material in order to keep the single cords together after dipping the plurality of single cords.

* * * * *